United States Patent
Young et al.

(10) Patent No.: US 10,205,173 B2
(45) Date of Patent: Feb. 12, 2019

(54) CATHODE DESIGN FOR ELECTROCHEMICAL CELLS

(71) Applicant: BDF IP HOLDINGS LTD., Vancouver (CA)

(72) Inventors: Alan Young, Surrey (CA); Siyu Ye, Burnaby (CA); Shanna D. Knights, North Vancouver (CA); Kyoung Bai, Vancouver (CA)

(73) Assignee: BDF IP HOLDINGS LTD., Vancouver (CA)

( * ) Notice: Subject to any disclaimer, the term of this patent is extended or adjusted under 35 U.S.C. 154(b) by 215 days.

(21) Appl. No.: 15/323,048

(22) PCT Filed: Jul. 8, 2015

(86) PCT No.: PCT/US2015/039608
§ 371 (c)(1),
(2) Date: Dec. 29, 2016

(87) PCT Pub. No.: WO2016/007671
PCT Pub. Date: Jan. 14, 2016

(65) Prior Publication Data
US 2017/0141406 A1 May 18, 2017

Related U.S. Application Data

(60) Provisional application No. 62/022,094, filed on Jul. 8, 2014.

(51) Int. Cl.
*H01M 4/86* (2006.01)
*H01M 4/92* (2006.01)
*H01M 8/1018* (2016.01)

(52) U.S. Cl.
CPC ....... *H01M 4/8657* (2013.01); *H01M 4/8652* (2013.01); *H01M 4/921* (2013.01); *H01M 4/926* (2013.01); *H01M 4/928* (2013.01); *H01M 2008/1095* (2013.01)

(58) Field of Classification Search
None
See application file for complete search history.

(56) References Cited

U.S. PATENT DOCUMENTS

| 7,419,740 B2 | 9/2008 | Binder et al. |
| 2014/0193740 A1 | 7/2014 | Vincent et al. |

FOREIGN PATENT DOCUMENTS

| EP | 2 692 005 A1 | 2/2014 |
| WO | 2004/073087 A2 | 8/2004 |
| WO | 2013/109283 A1 | 7/2013 |

OTHER PUBLICATIONS

Matsutani et al., "Effect of Particle Size of Platinum and Platinum-Cobalt Catalysts on Stability Against Load Cycling," *Platinum Metals Review* 54(4):223-232, 2010.
Murthy et al., "Investigation of Degradation Mechanisms Relevant to Automotive Fuel Cells," *3rd European PEFC Forum*, Session B03, Lucerne, Switzerland, Jul. 4-8, 2005, File No. B031. (10 pages).

*Primary Examiner* — Ladan Mohaddes
(74) *Attorney, Agent, or Firm* — Seed IP Law Group LLP

(57) ABSTRACT

A membrane electrode assembly comprises an anode electrode comprising an anode gas diffusion layer and an anode catalyst layer; a cathode electrode comprising a cathode gas diffusion layer and a cathode catalyst layer; and a polymer electrolyte membrane interposed between the anode catalyst layer and the cathode catalyst layer; wherein the cathode catalyst layer comprises: a first cathode catalyst sublayer adjacent the polymer electrolyte membrane, the first cathode catalyst sublayer comprising a first catalyst supported on a first carbonaceous support and a second catalyst supported on a second carbonaceous support; and a second cathode catalyst sublayer adjacent the cathode gas diffusion layer, the second cathode catalyst sublayer comprising a third catalyst supported on a third carbonaceous support; wherein the first carbonaceous support is carbon black and the second and third carbonaceous supports are graphitized carbon.

20 Claims, 3 Drawing Sheets

CATHODE DESIGN FOR ELECTROCHEMICAL CELLS

BACKGROUND

Field of the Invention

The present invention relates to catalyst layers for electrochemical cells, in particular, cathode catalyst layers of membrane electrode assemblies for electrochemical fuel cells.

Description of the Related Art

Electrochemical fuel cells convert fuel and oxidant into electricity. Solid polymer electrochemical fuel cells generally employ a membrane electrode assembly that includes a solid polymer electrolyte membrane disposed between two electrodes. The membrane electrode assembly is typically interposed between two electrically conductive flow field plates to form a fuel cell. These flow field plates act as current collectors, provide support for the electrodes, and provide passages for the reactants and products. Such flow field plates typically include fluid flow channels to direct the flow of the fuel and oxidant reactant fluids to an anode and a cathode of each of the membrane electrode assemblies, respectively, and to remove excess reactant fluids and reaction products. In operation, the electrodes are electrically coupled for conducting electrons between the electrodes through an external circuit. Typically, a number of fuel cells are electrically coupled in series to form a fuel cell stack having a desired power output.

The anode and the cathode each contain a layer of anode catalyst and cathode catalyst, respectively. The catalyst may be a metal, an alloy or a supported metal/alloy catalyst, for example, platinum supported on carbon black. The catalyst layer may contain an ion conductive material, such as NAFION® (provided by E. I. du Pont de Nemours and Co.) and/or a binder, such as polytetrafluoroethylene (PTFE). Each electrode further includes an electrically conductive porous substrate, such as carbon fiber paper or carbon cloth, for reactant distribution and/or mechanical support. The thickness of the porous substrate typically ranges from about 50 to about 250 microns. Optionally, the electrodes may include a porous sublayer disposed between the catalyst layer and the substrate. The sublayer usually contains electrically conductive particles, such as carbon particles, and, optionally, a water repellent material for modifying its properties, such as gas diffusion and water management. The catalyst may be coated onto the membrane to form a catalyst-coated membrane (CCM) or coated onto the sublayer or the substrate to form an electrode.

The catalyst is one of the most expensive components in a fuel cell due to the noble metals that are typically used. Such noble metals include platinum and gold, which are often mixed with or alloyed with other metals, such as ruthenium, iridium, cobalt, nickel, molybdenum, palladium, iron, tin, titanium, manganese, cerium, chromium, copper, and tungsten, to enhance preferred reactions and mitigate unwanted side reactions, which are different for the anode and the cathode.

The anode and cathode half-cell reactions in hydrogen gas fuel cells are shown in the following equations:

(1)

(2)

On the anode, the primary function is to oxidize hydrogen fuel to form protons and electrons. Depending on the fuel source, the anode catalyst may need to be tolerant to impurities. For example, carbon monoxide poisoning of the anode catalyst often occurs when operating on a reformate-based fuel. To mitigate carbon monoxide poisoning, a platinum alloy catalyst, such as platinum-ruthenium, is preferable on the anode.

On the cathode, the primary function is to reduce oxygen and form water. This reaction is inherently much slower than the anode reaction and, thus, the cathode catalyst loading is typically higher than the anode catalyst loading. One way of enhancing the cathode half-cell reaction is to improve the electrochemical activity and catalyst utilization of the catalyst layer, thereby reducing voltage losses related to catalytic kinetics. For example, U.S. Pat. No. 7,419,740 discloses membrane electrode assemblies having increased activity and improved utilization of the noble metal catalyst. In particular, the membrane electrode assemblies have reaction layers containing a noble metal catalyst supported on carbon and a proton-conducting polymer, wherein the reaction layer on the cathode side comprise at least two sublayers, a first sublayer and a second sublayer, on top of each other, wherein the first sublayer is in direct contact with the polymer electrolyte membrane and contains a noble metal black and a noble metal catalyst supported on carbon and the second sublayer contains a further supported noble metal catalyst. However, using noble metal blacks is not desirable because it is difficult to achieve low catalyst loadings, which is required to reduce cost, and tends to be create denser layers, which creates water management and gas diffusion issues due to the decrease porosity.

At the same time, catalysts in the anode and cathode need to be able to withstand degradation that may occur during fuel cell operation and fuel cell start-up and shutdown. Typical catalyst degradation modes include corrosion of the catalyst support material and platinum dissolution and agglomeration, which leads to a decrease in fuel cell performance due to the decreased platinum surface area. Catalyst degradation is an important issue because it has a detrimental impact on fuel cell lifetime and overall costs. To mitigate corrosion, graphitized carbon supports are preferable over carbon black supports because graphitized carbon supports are more stable and less susceptible to corrosion. According to M. Murthy and N. Sisofo ("Investigation of Degradation Mechanisms Relevant to Automotive Fuel Cells", 3$^{rd}$ European PEFC Forum, Session B03, File No. B031 (2005)), it is believed that the graphitization process removes surface functional groups, which reduces the extent of carbon corrosion. However, graphitized carbon supports also have a lower surface area, which makes it difficult to homogeneously disperse noble metal catalysts onto graphitized carbon supports. Therefore, catalysts having noble metals dispersed on graphitized carbon supports typically show a lower electrochemical activity and fuel cell performance than catalysts having noble metals dispersed on high surface area supports, such as carbon black.

As a result, there still exists much research in catalyst and catalyst layer designs to improve performance and durability of the catalysts while reducing costs. The present description addresses these issues and provides further related advantages.

BRIEF SUMMARY

Briefly, the present invention relates to catalyst layers for electrochemical fuel cells.

In one embodiment, a membrane electrode assembly comprises an anode electrode comprising an anode gas diffusion layer and an anode catalyst layer; a cathode electrode comprising a cathode gas diffusion layer and a cathode catalyst layer; and a polymer electrolyte membrane interposed between the anode catalyst layer and the cathode catalyst layer; wherein the cathode catalyst layer comprises: a first cathode catalyst sublayer adjacent the polymer electrolyte membrane, the first cathode catalyst sublayer comprising a first catalyst supported on a first carbonaceous support and a second catalyst supported on a second carbonaceous support; and a second cathode catalyst sublayer adjacent the cathode gas diffusion layer, the second cathode catalyst sublayer comprising a third catalyst supported on a third carbonaceous support; wherein the first carbonaceous support is carbon black and the second and third carbonaceous supports are at least partially graphitized.

In specific embodiments, the first catalyst supported on the first carbonaceous support comprises a platinum-cobalt alloy and the second and third catalysts supported on the second and third carbonaceous supports, respectively, comprises platinum.

In further embodiments, the ionomer in the first cathode catalyst sublayer is different than the ionomer in the second cathode catalyst sublayer.

In some embodiments, a membrane electrode assembly comprises an anode electrode comprising an anode gas diffusion layer and an anode catalyst layer; a cathode electrode comprising a cathode gas diffusion layer and a cathode catalyst layer; and a polymer electrolyte membrane interposed between the anode catalyst layer and the cathode catalyst layer; wherein the cathode catalyst layer comprises: a first cathode catalyst sublayer adjacent the polymer electrolyte membrane, the first cathode catalyst sublayer comprising a first catalyst supported on a first carbonaceous support and a second catalyst supported on a second carbonaceous support; and a second cathode catalyst sublayer adjacent the cathode gas diffusion layer, the second cathode catalyst sublayer comprising a third catalyst supported on a third carbonaceous support; wherein the first catalyst on the first carbonaceous support has a higher electrochemical activity than the second catalyst supported on the second carbonaceous support and the third catalyst supported on the third carbonaceous support.

These and other aspects will be evident upon reference to the attached drawings and following detailed description.

BRIEF DESCRIPTION OF THE FIGURES

In the figures, identical reference numbers identify similar elements or acts. The sizes and relative positions of elements in the figures are not necessarily drawn to scale. For example, the shapes of various elements and angles are not drawn to scale, and some of these elements are arbitrarily enlarged and positioned to improve figure legibility. Further, the particular shapes of the elements, as drawn, are not intended to convey any information regarding the actual shape of the particular elements, and have been solely selected for ease of recognition in the figures.

DETAILED DESCRIPTION

Unless the context requires otherwise, throughout the specification and claims which follow, the word "comprise" and variations thereof, such as "comprises" and "comprising" are to be construed in an open, inclusive sense, that is as "including but not limited to".

In the present context, "loading" refers to the amount of material that is formed or applied to a substrate, and is usually expressed as the mass of material per unit surface area of the substrate.

As used herein, "homogeneous" means that the constituents are substantially uniformly dispersed in the mixture.

In the present context, "hydrophobic" or "water-repellent" means that a water droplet would form a contact angle of at least 90 degrees when in contact with the hydrophobic material. Additionally, "hydrophilic" means that a water droplet would form a contact angle of less than 90 degrees or less when in contact with the hydrophilic material.

In the present context, "surface area" of the catalyst and catalyst support refers to the surface area as measured by the BET method.

As used herein, "graphitized carbon" refers to carbon materials that comprise mainly graphitic carbon on the surface of a carbon particle.

In the present context, carbonaceous supports that are "at least partially graphitized" means that the surface of the carbonaceous support comprises at least some graphitic carbon.

Figure 1:
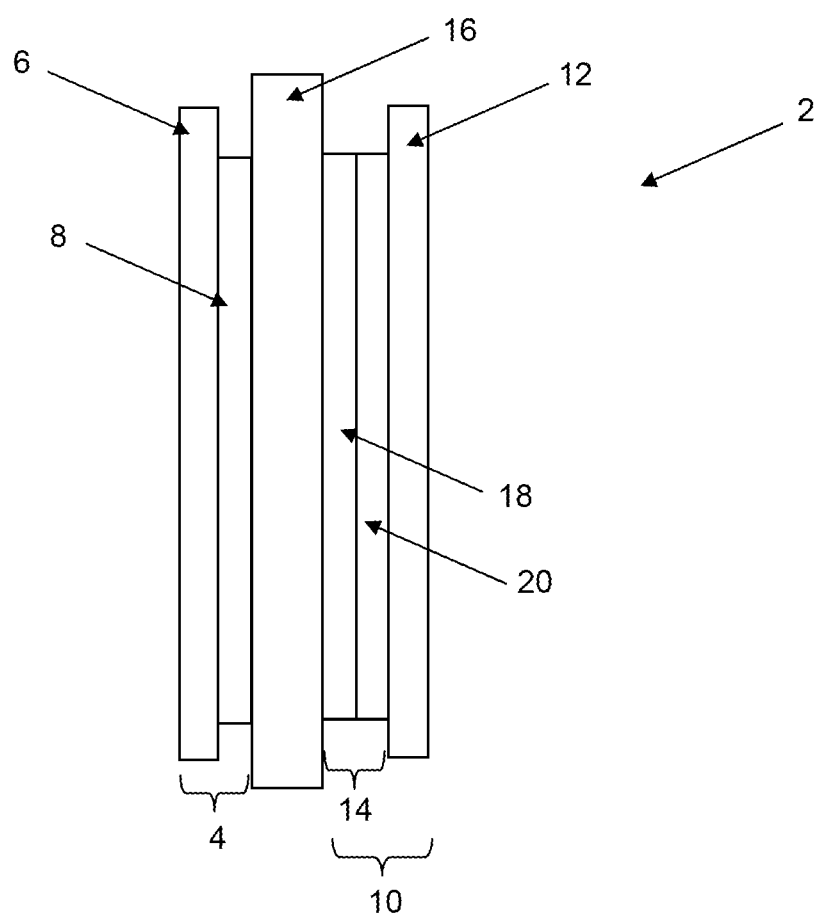
FIG. 1 shows an exploded cross-section of a membrane electrode assembly according to one embodiment.

According to one embodiment, with reference to FIG. 1, membrane electrode assembly 2 comprises an anode electrode 4 comprising an anode gas diffusion layer 6 and an anode catalyst layer 8; a cathode electrode 10 comprising a cathode gas diffusion layer 12 and a cathode catalyst layer 14; and a polymer electrolyte membrane 16 interposed between anode catalyst layer 8 and cathode catalyst layer 14; wherein cathode catalyst layer 14 comprises a first cathode catalyst sublayer 18 adjacent membrane 16, first cathode catalyst sublayer 18 comprising a first catalyst supported on a first support and a second catalyst supported on a second support; and a second cathode catalyst sublayer 20 adjacent cathode gas diffusion layer 12, second cathode catalyst sublayer 20 comprising a third catalyst supported on a third support; wherein the first carbonaceous support is carbon black and the second and third carbonaceous supports is at least partially graphitized.

As mentioned in the foregoing, catalysts supported on graphitized carbon show better durability due to decreased sites for attack, but poorer fuel cell performance than catalysts supported on carbon blacks and active carbons due to the decrease in surface area. Therefore, the challenge is to find a cathode catalyst and/or catalyst layer design that exhibits both high performance and high durability.

The inventors have surprisingly discovered that by employing a two-sublayer catalyst structure in the cathode, wherein the first sublayer, which is adjacent the membrane, comprises a mixture of a more durable supported catalyst and a more electrochemically active supported catalyst, and a second sublayer, which is adjacent the gas diffusion layer, comprises a more durable supported catalyst, the resulting fuel cell surprisingly exhibits both performance and durability gains in comparison to other cathode electrode designs.

The first, second, and third catalysts may be platinum, gold, ruthenium, iridium, cobalt, nickel, molybdenum, palladium, iron, tin, titanium, manganese, cerium, chromium, copper, and tungsten, and alloys, solid solutions, and intermetallic compounds thereof. The first catalyst may be the same or different from the second and third catalyst. In addition, the second catalyst may be the same or different than the third catalyst.

The first, second, and third catalyst supports may be a carbonaceous support, such as activated carbon, carbon black, carbon that is at least partially graphitized, and graphite. In specific embodiments, the first catalyst support is a carbon black while the second support is graphitized carbon. As a person skilled in the art will appreciate, the graphitization level of the carbon support can be measured via a number of techniques, such as high resolution TEM spectroscopy, Raman spectroscopy, and XPS (x-ray photoemission spectra).

In some embodiments, the first catalyst support in the first catalyst sublayer preferably has a greater surface area than the second catalyst support, which is also in the first catalyst sublayer, as well as the third catalyst support, which is in the second catalyst sublayer adjacent the gas diffusion layer. For example, the first catalyst support may have a surface area ranging from about 250-2000 $m^2/g$ while the second and third catalyst supports may have a surface area ranging from about 40-1500 $m^2/g$. The second and third catalyst support materials may be the same or different materials. For example, the second and third catalyst supports may have different degrees of graphitization on their surface, but both the second and third catalyst supports will still have a lower surface area than the first catalyst support.

In some embodiments, any of the first, second, and third catalysts may have the same or different coverage on its support. For example, the first supported catalyst may be a 20 wt % platinum supported on carbon black, the second supported catalyst may be a 40 wt % platinum supported on graphitized carbon, and the third supported catalyst may be a 50 wt % platinum supported on graphitized carbon.

In some embodiments, the more durable supported catalyst comprises a noble metal supported on a graphitized carbon support and the more electrochemically active supported catalyst comprises a noble metal supported on a carbon black support.

In one embodiment, the first supported catalyst comprises platinum black on a carbon black support, such as acetylene carbon black, and the second and third supported catalyst comprise platinum supported on a graphitized carbon support. As mentioned in the foregoing, platinum supported on carbon black has a higher electrochemical activity than platinum supported on a carbon that is at least partially graphitized due to the higher surface area of the carbon black support than the at least partially graphitized carbon support. (One skilled in the art will appreciate that electrochemical activity can be measured as mass activity (i.e., based on weight in A/g) or specific activity (i.e., based on surface area in $A/m^2$).)

In one specific embodiment, the first supported catalyst comprises a platinum-cobalt alloy supported on a carbon black support, such as acetylene carbon black, and the second and third supported catalysts comprise platinum supported on a graphitized carbon support. It is well-known in the art that supported platinum-cobalt alloy catalysts generally have higher catalytic activity than supported platinum-only catalysts at the same platinum loadings and support materials, but platinum-cobalt alloy catalysts typically show a higher degradation rate via platinum dissolution and agglomeration induced by potential cycling between, for example, about 0.65 V and about 1.05 V (Matsutani et al., "Effect of Particle Size of Platinum and Platinum-Cobalt Catalysts on Stability Against Load Cycling", *Platinum Metals Review*, 2010, 54, (4), pp. 223-232). In another specific embodiment, the first supported catalyst comprises platinum-nickel alloy supported on carbon, such as those used for shape-controlled catalysts.

The noble metal loading of the anode and cathode electrode should be low to minimize cost. For example, the platinum loading of the anode electrode may range from about 0.01 mg $Pt/cm^2$ to about 0.15 mg $Pt/cm^2$ while the platinum loading of the cathode electrode may range from about 0.1 mg $Pt/cm^2$ to about 0.6 mg $Pt/cm^2$. The anode and cathode catalyst layers and sublayers may contain additional carbon and/or graphite particles to assist with catalyst layer application, and for water management purposes. The anode and cathode catalyst layers and sublayers may also contain a binder such as hydrophobic binder (e.g., PTFE), ionomer, and combinations thereof. The cathode catalyst sublayers may each contain the same amount of ionomer or may contain different amounts of ionomer. The ionomer content may range from, for example, 10 wt % to 50 wt %. In some embodiments, the ionomer content of the first catalyst sublayer, which is adjacent the membrane, is greater than the ionomer content of the second catalyst sublayer, which is adjacent the GDL. Without being bound by theory, the higher ionomer content of the first catalyst sublayer provides improved proton connectivity to the membrane and a lower ionomer content of the second catalyst sublayer provides improved reactant access to the catalyst.

In some embodiments, the first and second cathode catalyst sublayers may have the same or different ionomers that differ in chemical structure, composition and/or equivalent weight. Ionomers may be, for example, perfluorinated, partially fluorinated, or hydrocarbon-based. Exemplary ionomers in the catalyst sublayers include, but are not limited to, those that are sold under the Nafion® (DuPont), Aciplex® (Asahi Kasei Corporation), and Aquivion® (Solvay Plastics) tradenames.

The anode gas diffusion layer and cathode gas diffusion layer should be electrically conductive, thermally conductive, adequately stiff for mechanical support of the catalyst layer and membrane, sufficiently porous to allow for gas diffusion, and thin and lightweight for high power density. Thus, conventional gas diffusion layer materials are typically chosen from commercially available woven and non-woven porous carbonaceous substrates, including carbon fiber paper and carbon fabrics, such as carbonized or graphitized carbon fiber non-woven mats. Suitable porous substrates include, but are not limited to, TGP-H-060 and TGP-H-090 (Toray Industries Inc., Tokyo, Japan); AvCarb® P50 and EP-40 (Ballard Material Products Inc., Lowell, Mass.); and GDL 24 and 25 series material (SGL Carbon Corp., Charlotte, N.C.). In some embodiments, the porous substrate may be hydrophobized, and may optionally include at least one gas diffusion sublayer having carbon and/or graphite in fibrous and/or particulate form.

The polymer electrolyte membrane may be any suitable proton-conducting material or ionomer, such as, but not limited to, Nafion® (DuPont), BAM® (Ballard Power Systems, Canada), Flemion® (Asahi Glass, Japan), Aquivion® (Solvay Plastics), GORE-SELECT® (W.L. Gore & Associates), and Aciplex® (Asahi Kasei, Japan).

The MEA and catalyst layers and sublayers can be made via methods known in the art. For example, the catalyst ink may be directly applied to the gas diffusion layer or membrane by screen-printing, knife-coating, spraying or gravure coating, or decal-transferred to the gas diffusion layer or membrane. The catalyst ink may be applied in a single application or in multiple thin coatings to achieve the desired catalyst loading and/or catalyst layer structure.

While only noble metals have been identified as catalyst materials in the present description, one skilled in the art will appreciate that non-noble metal catalysts may also be used in fuel cells. The inventors contemplate that such non-noble metal catalysts may be a substitute for the noble metal catalysts as described herein. Furthermore, while only carbon and graphitized carbon supports have been discussed, it is contemplated that other carbon supports, such as carbon nanotubes and carbon nanofibers, and non-carbon supports, such as oxide supports, may also be substituted for the supports described herein. In addition, while only the cathode electrode design has been discussed and shown, the inventors contemplate that the anode electrode may also benefit from a two-sublayer catalyst layer design.

EXAMPLES

Four different cathode catalyst inks were made for the MEAs for fuel cell testing. The first cathode catalyst ink contained a Pt catalyst supported on graphitized carbon dispersed in a Nafion® ionomer. The second cathode catalyst ink contained a Pt—Co alloy catalyst supported on carbon black dispersed in Nafion® ionomer. The third cathode catalyst ink contained 30 wt % platinum of a Pt—Co alloy catalyst supported on carbon black and 70 wt % platinum of a Pt catalyst supported on graphitized carbon, mixed together and dispersed in Nafion® ionomer. The fourth cathode catalyst ink contained 50 wt % platinum of a Pt—Co alloy catalyst supported on carbon black and 50 wt % platinum of a Pt catalyst supported on graphitized carbon, mixed together and dispersed in Nafion® ionomer.

For Comparative Example 1, the first cathode catalyst ink was coated onto a Nafion® membrane (provided by E. I. du Pont de Nemours and Co.) to form a half-CCM. The total platinum loading of the cathode catalyst was about 0.4 mg Pt/cm$^2$.

For Comparative Example 2, the second cathode catalyst ink was coated onto a Nafion® membrane to form a half-CCM. The total platinum loading of the cathode catalyst was about 0.4 mg Pt/cm$^2$.

For Comparative Example 3, the second cathode catalyst ink was coated onto a Nafion® membrane to form a first cathode catalyst sublayer. Thereafter, the first cathode catalyst ink was coated onto the cathode catalyst sublayer, to form a half-CCM. The total platinum loading of each the first and second cathode catalyst sublayers was about 0.1 mg/cm$^2$ and 0.3 mg/cm$^2$, respectively, to yield a total platinum loading of about 0.4 mg Pt/cm$^2$ in the cathode.

For Comparative Example 4, the third cathode catalyst ink was coated onto a Nafion® membrane to form a half CCM. The total platinum loading of the cathode catalyst was about 0.4 mg Pt/cm$^2$.

For Comparative Example 5, the third cathode catalyst ink was coated onto a Nafion® membrane to form a first cathode catalyst sublayer. Thereafter, the second cathode catalyst ink was coated onto the cathode catalyst sublayer to form a half-CCM. The total platinum loading of each the first and second cathode catalyst sublayers was about 0.2 mg/cm$^2$, to yield a total platinum loading of about 0.4 mg Pt/cm$^2$ in the cathode.

For Inventive Example 1, the third cathode catalyst ink was coated onto a Nafion® membrane to form a first cathode catalyst sublayer. Thereafter, the first cathode catalyst ink was coated onto the cathode catalyst sublayer to form a half-CCM. The total platinum loading of each the first and second cathode catalyst sublayers was about 0.2 mg/cm$^2$, to yield a total platinum loading of about 0.4 mg Pt/cm$^2$ in the cathode.

For Inventive Example 2, the fourth cathode catalyst ink was coated onto a Nafion® membrane to form a first cathode catalyst sublayer. Thereafter, the first cathode catalyst ink was coated onto the cathode catalyst sublayer to form a half-CCM. The total platinum loading of each the first and second cathode catalyst sublayers was about 0.2 mg/cm$^2$, to yield a total platinum loading of about 0.4 mg Pt/cm$^2$ in the cathode.

Each of the half-CCMs then had a supported platinum anode catalyst layer decal transferred to the membrane side of the half-CCM to form a complete CCM. The complete CCM was then sandwiched between two hydrophobized carbon fibre GDLs from Ballard Material Products (Lowell, Mass.) such that the GDLs were adjacent the catalyst layers and subsequently sealed to form an unbonded MEA. (If the cathode catalyst layer contained two sublayers, then the GDL was placed against the second cathode catalyst sublayer.) The following table summarizes the MEA configurations.

TABLE 1

MEA Configurations

| MEA name | Anode Catalyst | Cathode Catalyst - Sublayer #1 | Cathode Catalyst - Sublayer #2 |
|---|---|---|---|
| Comparative Example 1 | 0.1 mg Pt/cm$^2$, platinum supported on carbon black, 23 wt % Nafion® ionomer | 0.4 mg Pt/cm$^2$, platinum supported on graphitized carbon black, 23 wt % Nafion® ionomer | None |
| Comparative Example 2 | 0.1 mg Pt/cm$^2$, platinum supported on carbon black, 23 wt % Nafion® ionomer | 0.4 mg Pt/cm$^2$, Pt—Co alloy supported on carbon black, 23 wt % Nafion® ionomer | None |
| Comparative Example 3 | 0.1 mg Pt/cm$^2$, platinum supported on carbon black, 23 wt % Nafion® ionomer | 0.1 mg Pt/cm$^2$ of Pt—Co alloy supported on carbon black, 36 wt % Nafion® ionomer | 0.3 mg Pt/cm$^2$, platinum supported on graphitized carbon black, 23 wt % Nafion® ionomer |
| Comparative Example 4 | 0.1 mg Pt/cm$^2$, platinum supported on carbon black, 23 wt % Nafion® ionomer | 0.12 mg Pt/cm$^2$ of Pt—Co alloy supported on carbon black, 0.28 Pt/cm$^2$ of Pt supported on graphitized carbon black, 36 wt % Nafion® ionomer | None |

TABLE 1-continued

MEA Configurations

| MEA name | Anode Catalyst | Cathode Catalyst - Sublayer #1 | Cathode Catalyst - Sublayer #2 |
|---|---|---|---|
| Comparative Example 5 | 0.1 mg Pt/cm$^2$, platinum supported on carbon black, 23 wt % Nafion ® ionomer | 0.06 mg Pt/cm$^2$ of Pt—Co alloy supported on carbon black, 0.14 Pt/cm$^2$ of Pt supported on graphitized carbon black, 36 wt % Nafion ® ionomer | 0.2 mg Pt/cm$^2$, Pt—Co alloy supported on carbon black, 23 wt % Nafion ® ionomer |
| Inventive Example 1 | 0.1 mg Pt/cm$^2$, platinum supported on carbon black, 23 wt % Nafion ® ionomer | 0.06 mg Pt/cm$^2$, Pt—Co alloy supported on carbon black 0.14 Pt/cm$^2$, platinum supported on graphitized carbon black, 36 wt % Nafion ® ionomer | 0.2 mg Pt/cm$^2$, platinum supported on graphitized carbon black, 23 wt % Nafion ® ionomer |
| Inventive Example 2 | 0.1 mg Pt/cm$^2$, platinum supported on carbon black, 23 wt % Nafion ® ionomer | 0.1 mg Pt/cm$^2$ of Pt—Co alloy supported on carbon black, 0.1 Pt/cm$^2$ of Pt supported on graphitized carbon black, 36 wt % Nafion ® ionomer | 0.2 mg Pt/cm$^2$, platinum supported on graphitized carbon black, 23 wt % Nafion ® ionomer |

Each of the MEAs were then placed between flow field plates to form fuel cells, and then subjected to conditioning overnight and potential cycling at the following conditions to determine the voltage degradation due to platinum dissolution and redeposition. The MEAs were tested with about 21% oxygen as the oxidant (i.e., air) to simulate fuel cell inlet conditions and several of the MEAs (Comparative Examples 1, 4, 5, and Inventive Examples 1 and 2) were also tested at about 10.5% oxygen (i.e., diluted air) as the oxidant to simulate fuel cell outlet conditions.

TABLE 2

Cycling Test Conditions

| Fuel | 100% Hydrogen |
|---|---|
| Oxidant | Air (21% - inlet, 10.5% - outlet) |
| Relative humidity | 100% |
| Temperature | 80° C. |
| Pressure | 5 psig for both oxidant and fuel |
| Cycling test procedure | 60 seconds at 1.2 V |
| | 30 seconds at 0.6 V |

Figure 2:
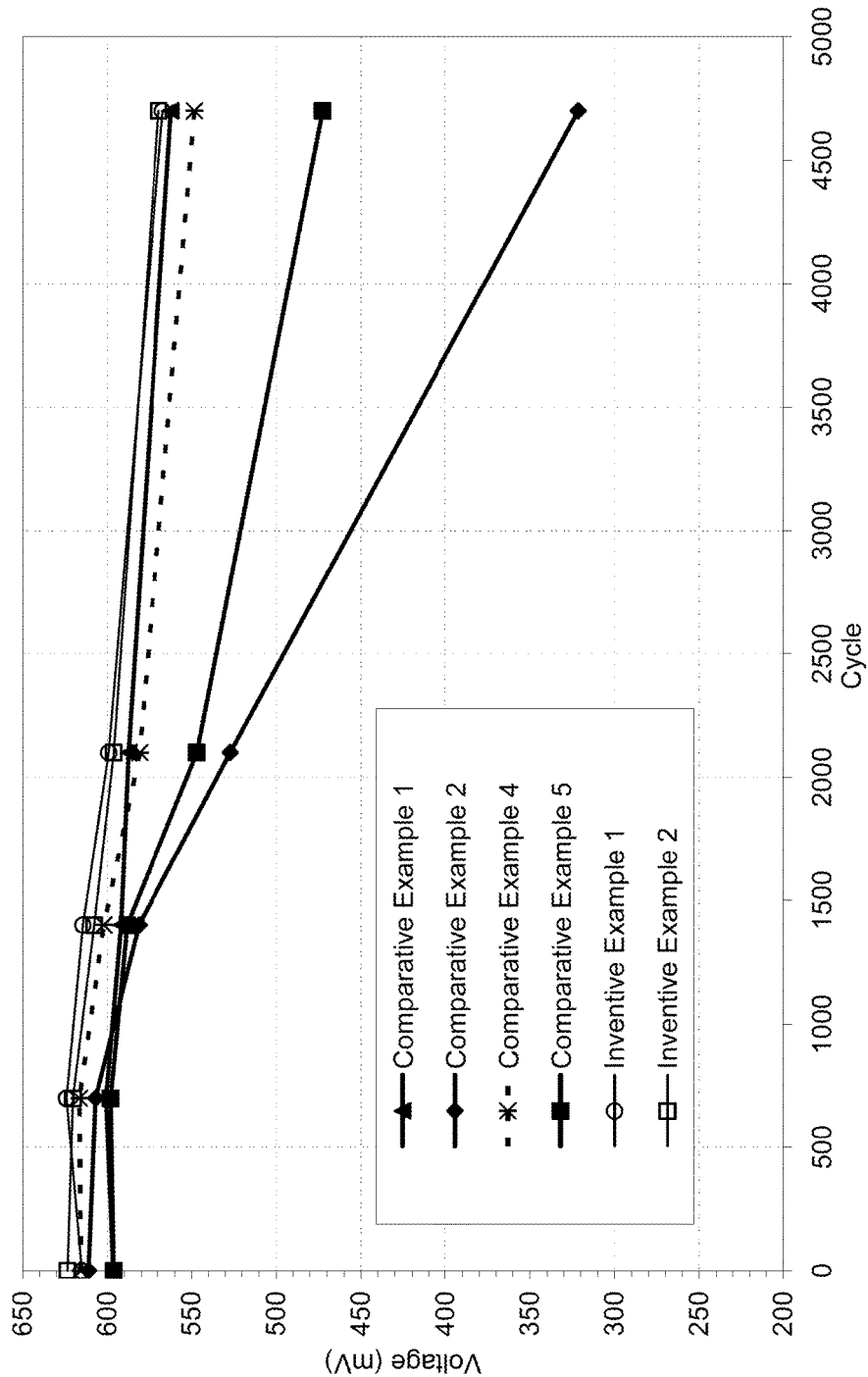
FIG. 2 shows a graph of the fuel cell performance degradation with potential cycling under inlet conditions (about 21% oxygen).
Figure 3:
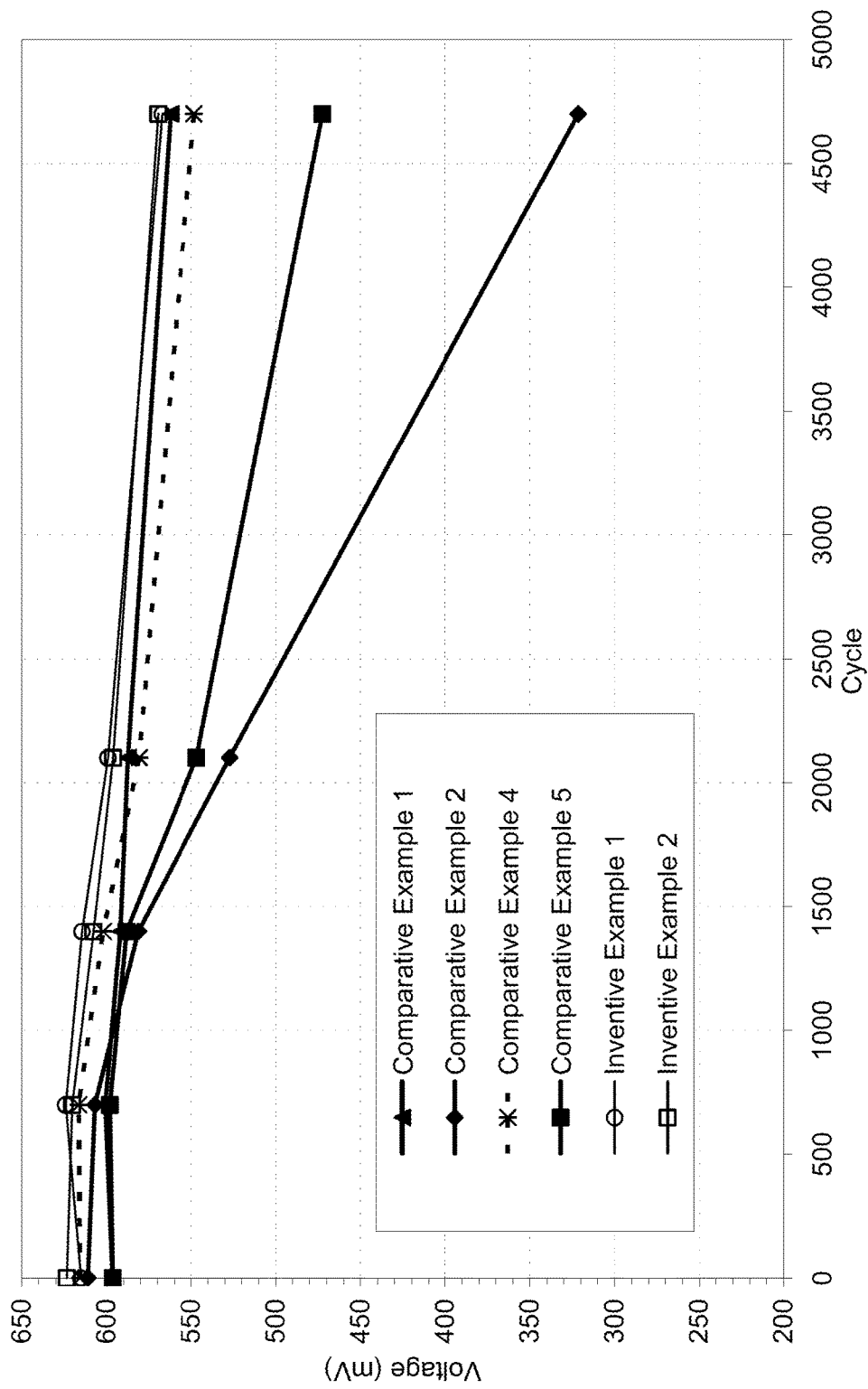
FIG. 3 shows a graph of the fuel cell performance degradation with potential cycling under outlet conditions (about 10.5% oxygen).

The fuel cells were periodically tested for performance at 1 A/cm$^2$ current density at 75° C. after each of 700, 1400, 2100, and 4700 cycles, as shown in FIG. 2 under inlet conditions and in FIG. 3 under outlet conditions. Overall, Inventive Examples 1 and 2 showed the best performance and least amount of degradation after 4700 cycles under both inlet and outlet conditions.

For the inlet conditions, between Comparative Example 1 and 2, it is clear that Comparative Example 1 with the catalyst supported on graphitized carbon support showed an initial performance of only about 647 mV but exhibited only 31 mV of degradation (606 mV) after 4700 cycles under inlet conditions. On the other hand, Comparative Example 2 with the catalyst supported on carbon black showed a high initial performance of about 666 mV but exhibited substantial degradation of over 400 mV after 4700 cycles under inlet conditions.

The combination of the two types of supported catalysts (the first and second catalyst inks) showed mixed results under inlet conditions. Comparative Example 3, which had both types of supported catalysts in separate layers, showed worse performance (630 mV) than Comparative Examples 1 and 2, and suffered almost 90 mV of degradation after 4700 cycles. Comparative Example 4, which had both types of supported catalysts in a mixed layer, showed better performance (669 mV) and durability (29 mV loss after 4700 cycles) than Comparative Examples 1, 2, and 3, but still below those of Inventive Examples 1 and 2.

Comparative Example 5, Inventive Example 1, and Inventive Example 2 had two separate cathode catalyst sublayers, with the first sublayer adjacent the membrane containing two different supported catalysts and the second sublayer adjacent the gas diffusion layer containing only a single supported catalyst. All of Comparative Example 5, Inventive Example 1, and Inventive Example 2 had the same components in the first sublayer, that is, a mixture of platinum on supported on graphitized carbon and platinum-cobalt alloy supported on carbon black. However, Comparative Example 5 comprised in its second layer platinum-cobalt alloy supported on carbon black, while Inventive Examples 1 and 2 comprised in its second layer platinum on graphitized carbon black. FIG. 2 shows that Comparative Example 5 exhibited lower initial performance (658 mV) than Inventive Example 1 (666 mV) and Inventive Example 2 (682 mV), and also suffered more degradation (over 60 mV) than Inventive Example 1 (22 mV) and Inventive Example 2 (36 mV) after 4700 mV. At outlet conditions, as shown in FIG. 3, Comparative Example 5 also showed lower initial performance (596 mV) than Inventive Example 1 (615 mV) and Inventive Example 2 (623 mV), as well as suffered more degradation (over 120 mV) than Inventive Example 1 (about 50 mV) and Inventive Example 2 (54 mV).

It should be noted that Comparative Examples 3 and 4, and Inventive Example 2 had similar proportions platinum supported on graphitized carbon and platinum-cobalt alloy supported on carbon black, but differ in the distribution (mixed together in Comparative Example 4 and separate sublayers in Inventive Example 2). However, it is clear in FIG. 2 that Inventive Example 2 showed better initial performance than both of Comparative Examples 3 and 4 (682 mV as opposed to 630 mV and 669 mV, respectively) at inlet conditions. In addition, as shown in FIG. 3, Inventive Example 2 showed better initial performance than Comparative Example 4 (623 mV as opposed to 616 mV, respectively) at outlet conditions.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety. This application also claims the benefit of U.S. Provisional Patent Application No. 62/022,094, filed Jul. 8, 2014, and is incorporated herein by reference in its entirety.

While particular elements, embodiments, and applications of the present invention have been shown and described, it will be understood that the invention is not limited thereto since modifications may be made by those skilled in the art without departing from the spirit and scope of the present disclosure, particularly in light of the foregoing teachings.

What is claimed is:

1. A membrane electrode assembly comprising:
    an anode electrode comprising an anode gas diffusion layer and an anode catalyst layer;
    a cathode electrode comprising a cathode gas diffusion layer and a cathode catalyst layer; and
    a polymer electrolyte membrane interposed between the anode catalyst layer and the cathode catalyst layer;
    wherein the cathode catalyst layer comprises:
        a first cathode catalyst sublayer adjacent the polymer electrolyte membrane, the first cathode catalyst sublayer comprising a first catalyst supported on a first carbonaceous support and a second catalyst supported on a second carbonaceous support; and
        a second cathode catalyst sublayer adjacent the cathode gas diffusion layer, the second cathode catalyst sublayer comprising a third catalyst supported on a third carbonaceous support;
        wherein the first carbonaceous support is carbon black and the second and third carbonaceous supports are at least partially graphitized.

2. The membrane electrode assembly of claim 1, wherein the first, second, and third catalysts are selected from the group consisting of platinum, gold, ruthenium, iridium, cobalt, nickel, molybdenum, palladium, iron, tin, titanium, manganese, cerium, chromium, copper, and tungsten, and alloys, solid solutions, and intermetallic compounds thereof.

3. The membrane electrode assembly of claim 1, wherein the first, second and third catalyst comprise platinum.

4. The membrane electrode assembly of claim 1, wherein the first catalyst comprises an alloy of platinum and cobalt.

5. The membrane electrode assembly of claim 1, wherein the first catalyst comprises an alloy of platinum and nickel.

6. The membrane electrode assembly of claim 1, wherein the specific surface area of the first carbonaceous support is greater than the specific surface area of the second and third carbonaceous supports that are at least partially graphitized.

7. The membrane electrode assembly of claim 1, wherein the first carbonaceous support has a specific surface area of about 250-2000 $m^2/g$, and wherein the second and third carbonaceous supports that are at least partially graphitized has a specific surface area of about 40-1500 $m^2/g$.

8. The membrane electrode assembly of claim 1, wherein the first and second cathode catalyst sublayers comprise an ionomer.

9. The membrane electrode assembly of claim 8, wherein an ionomer content of the first cathode catalyst sublayer is different than an ionomer content of the second cathode catalyst sublayer.

10. A fuel cell comprising the membrane electrode assembly of claim 1.

11. A membrane electrode assembly comprising:
    an anode electrode comprising an anode gas diffusion layer and an anode catalyst layer;
    a cathode electrode comprising a cathode gas diffusion layer and a cathode catalyst layer; and
    a polymer electrolyte membrane interposed between the anode catalyst layer and the cathode catalyst layer;
    wherein the cathode catalyst layer comprises:
        a first cathode catalyst sublayer adjacent the polymer electrolyte membrane, the first cathode catalyst sublayer comprising a first catalyst supported on a first carbonaceous support and a second catalyst supported on a second carbonaceous support; and
        a second cathode catalyst sublayer adjacent the cathode gas diffusion layer, the second cathode catalyst sublayer comprising a third catalyst supported on a third carbonaceous support;
        wherein the first catalyst on the first carbonaceous support has a higher electrochemical activity than the second catalyst supported on the second carbonaceous support and the third catalyst supported on the third carbonaceous support.

12. The membrane electrode assembly of claim 11, wherein the second and third carbonaceous supports are at least partially graphitized.

13. The membrane electrode assembly of claim 11, wherein the first carbonaceous support has a specific surface area of about 250-2000 $m^2/g$, and wherein the second and third carbonaceous supports have a specific surface area of about 40-1500 $m^2/g$.

14. The membrane electrode assembly of claim 11, wherein the first, second, and third catalysts are selected from the group consisting of platinum, gold, ruthenium, iridium, cobalt, nickel, molybdenum, palladium, iron, tin, titanium, manganese, cerium, chromium, copper, and tungsten, and alloys, solid solutions, and intermetallic compounds thereof.

15. The membrane electrode assembly of claim 11, wherein the first, second and third catalyst comprise platinum.

16. The membrane electrode assembly of claim 11, wherein the first catalyst comprises an alloy of platinum and cobalt.

17. The membrane electrode assembly of claim 11, wherein the first catalyst comprises an alloy of platinum and nickel.

18. The membrane electrode assembly of claim 11, wherein the first and second cathode catalyst sublayers comprise an ionomer.

19. The membrane electrode assembly of claim 18, wherein an ionomer content of the first cathode catalyst sublayer is different than an ionomer content of the second cathode catalyst sublayer.

20. A fuel cell comprising the membrane electrode assembly of claim 11.

* * * * *